UNITED STATES PATENT OFFICE.

A. QUESNOT, OF BLOOMINGTON, ILLINOIS.

IMPROVEMENT IN THE MANUFACTURE OF ARTIFICIAL STONE.

Specification forming part of Letters Patent No. 92,358, dated July 6, 1869.

*To all whom it may concern:*

Be it known that I, A. QUESNOT, of Bloomington, in the county of McLean, in the State of Illinois, have invented a new and Improved Mode of Making Artificial Stones and Marble; and I do hereby declare that the following is a full and exact description thereof.

The nature of my invention consists in making artificial stones and marbles with the following composition: Hydraulic lime, slaked by means of a solution of alum in hot water, two parts; river-sand, ten parts; Kentucky cement, (or similar kind,) one part.

To enable others skilled in the art to make and use my invention, I will proceed to describe the manner of operating.

I dissolve a certain quantity of alum in fifteen times its volume of water. I then slake the lime by sprinkling this alum solution upon it until effervescence ceases, taking care, however, to keep it in a pasty consistence. I then mix the lime and sand in a homogeneous and intimate manner, without addition of water, but by sprinkling with the alum solution, taking care, however, to keep the whole to a pasty powder. When the whole is thoroughly mixed, I add the amount of cement mentioned above. The mixture is then to be introduced into molds at once by thin successive layers, which may be agglomerated by pressure or ramming. Twenty-four hours after, the matter may be taken out of the molds. The stone, laid in a damp place, will absorb carbonic acid, and may be used fifteen days after it has been taken out of the mold. The hardness acquired in this space of time is already well defined, but the stone does not become thoroughly hard except by age.

Alum, being a double sulphate of alumina and of potassa or ammonia, combines with lime, and produces a compound similar to certain oxides found in nature. This combination in a short while gets perfectly hard, and gains in hardness with time by absorbing carbonic acid, according to the well-known law of mortars and cements.

The sample sent with this application was molded on the 10th January, 1869, and will afford an opportunity to test its hardness.

To make artificial marble or stucco I proceed thus: I take equal parts of hydraulic lime and marble ground to powder and sifted, and I mix them in the dry state. Then I carefully add the dissolution of alum above described so as to form a firm and homogeneous paste. I divide into parts and color it according to the requirements of the work needed. It is necessary to employ colors belonging to the mineral kingdom only, as vegetable colors do not combine well, and are deteriorated by the weather.

I then make slabs of a certain thickness, colored differently. I lay them horizontally one upon the other, according to the work required, and I leave this to itself for twenty-four hours. At the expiration of this time I cut the mass vertically with a trowel or spatula, in slices of half-an-inch thickness, and put these slices against the sides of the mold. The veins and variations are then formed naturally under the pressure of the tool or of the hand.

This being done I fill the vacant space in the mold with the composition for artificial stone, as described above, and I operate as for stone-making, taking care, however, to bind the stucco and stone together by means of small rolls of paste put in the requisite places, suggested by the pattern of the work, in order to make the whole compact and homogeneous.

To polish this artificial marble, I rub it, when dry, with pumice-stone, and for moldings I use a piece of charcoal to reach the bottom, taking care to pass a wet sponge upon the rubbed parts. I then polish with a piece of felt dipped in oil and emery, and then with felt and oil only.

In this state, this stucco has the brilliancy of marble, and will stand water and frost, and will take the place of marble for interior or exterior decorations. It may be colored to imitate all kinds of marble.

I claim—

In the manufacture of artificial stone the composition above described and set forth.

In testimony whereof, I have signed my name to this specification in the presence of two subscribing witnesses.

A. QUESNOT.

Attest:
F. H. GARVIN,
A. S. ALEXANDER.